Sept. 14, 1948.  J. JERGER  2,449,231
AIRCRAFT CABIN PRESSURE CONTROL
Filed Sept. 2, 1939  3 Sheets-Sheet 1
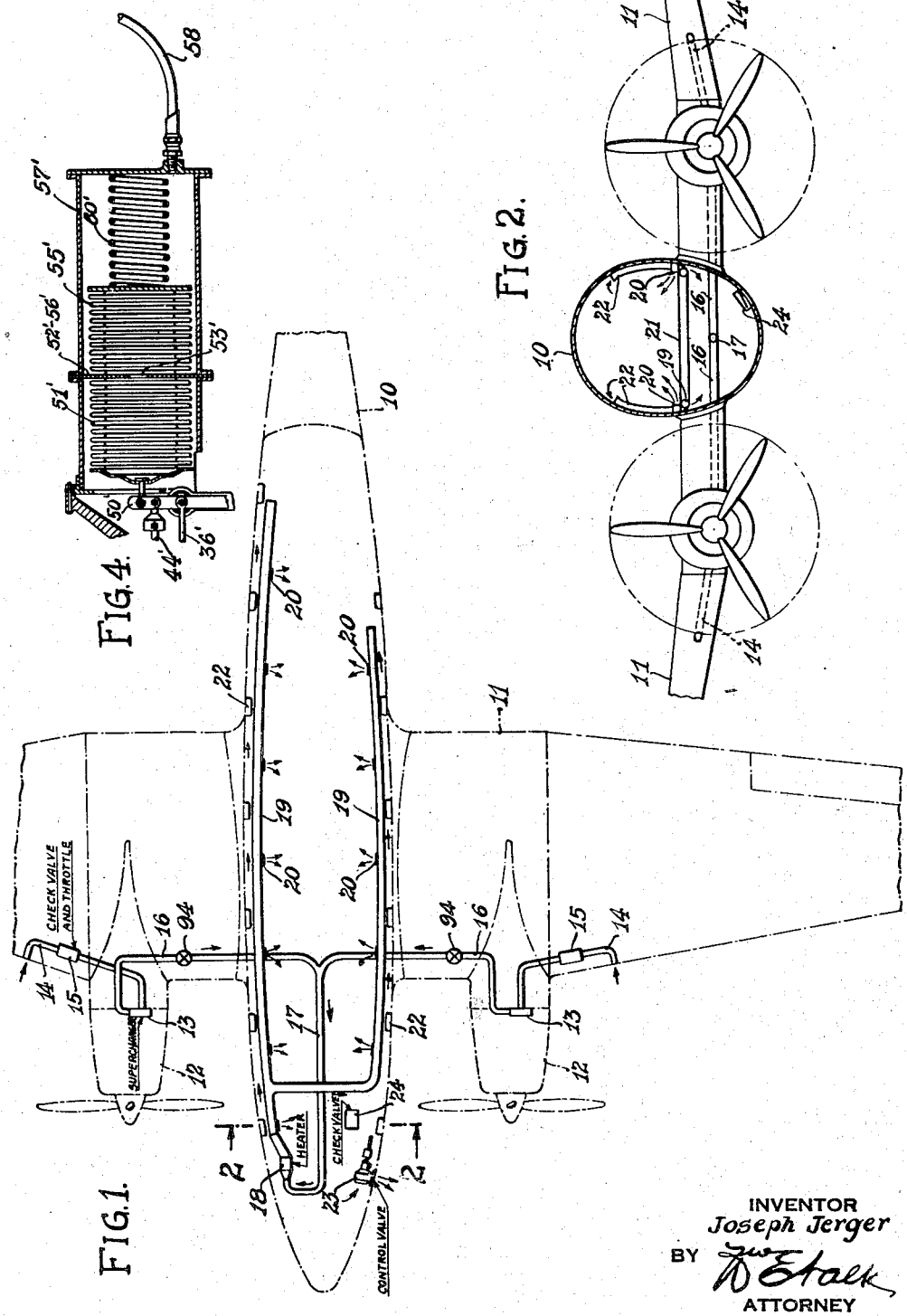
INVENTOR
Joseph Jerger
BY
ATTORNEY Sept. 14, 1948. J. JERGER 2,449,231
AIRCRAFT CABIN PRESSURE CONTROL
Filed Sept. 2, 1939 3 Sheets-Sheet 2
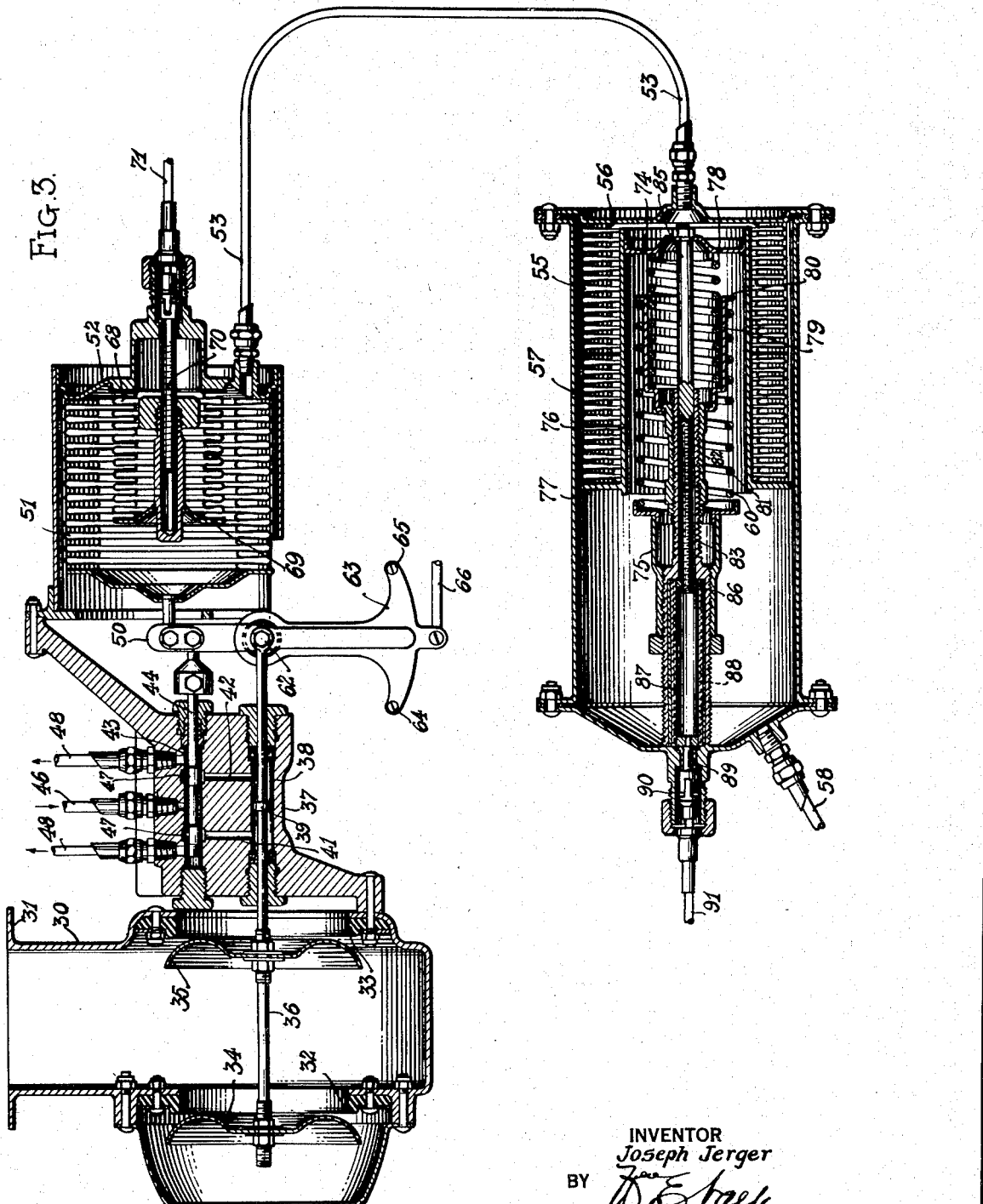
INVENTOR
Joseph Jerger
BY
ATTORNEY Sept. 14, 1948.  J. JERGER  2,449,231
AIRCRAFT CABIN PRESSURE CONTROL
Filed Sept. 2, 1939  3 Sheets-Sheet 3
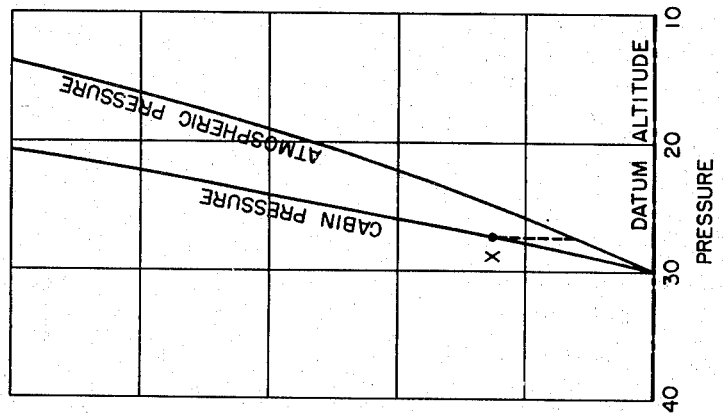
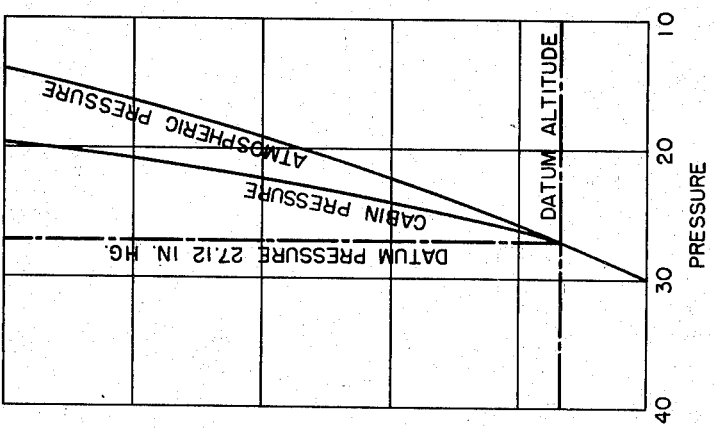
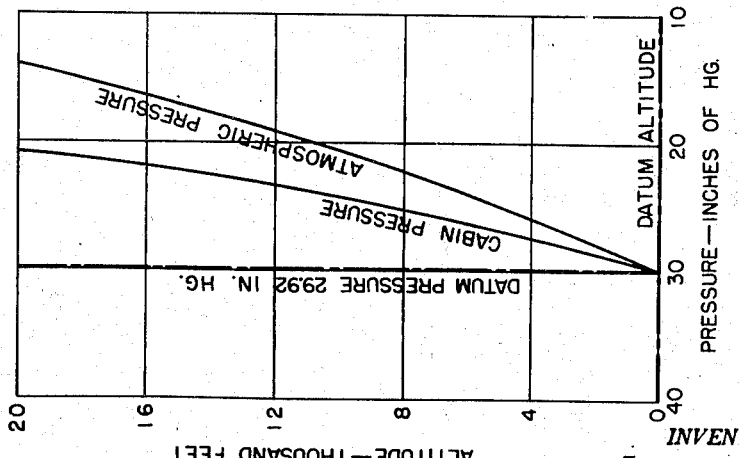
INVENTOR.
Joseph Jerger
BY
Richard W. Treverton
ATTORNEY.

Patented Sept. 14, 1948

2,449,231

UNITED STATES PATENT OFFICE 2,449,231

AIRCRAFT CABIN PRESSURE CONTROL

Joseph Jerger, Ferguson, Mo., assignor to Curtiss-Wright Corporation, a corporation of Delaware Application September 2, 1939, Serial No. 293,223

17 Claims. (Cl. 98—1.5)

This invention relates to aircraft and concerns particularly a method of supercharging an aircraft cabin to a pressure above the pressure of the surrounding atmosphere at altitudes above ground level.

An object of the invention is to provide an automatic means for regulating the cabin pressure in such a manner that it is maintained at a value inversely proportional to the altitude but greater than the pressure of the adjacent atmosphere. Expressing this objective in different terms, the pressure in the cabin will be equivalent to an altitude which is some fraction of the altitude in which the airplane is actually flying. For instance, if the aircraft is flying at a level of 20,000 feet, the cabin pressure may be equivalent to an altitude of approximately 10,000 feet; if the actual altitude is 15,000 feet, the cabin pressure may be equivalent to an altitude of about 7,500 feet, etc. The control apparatus is so arranged that at ground level or at any other selected level, cabin pressure and atmospheric pressure may be equal, but above the datum level, the atmospheric pressure may change with altitude at a much greater rate than does the cabin pressure.

By the use of the invention substantial improvements are possible in the method of operating high altitude aircraft since descent from high altitude may be made at a uniform high rate to ground level and the cabin pressure will gradually increase from that at said high altitude to ground level pressure at a uniform low rate.

Other systems of cabin supercharge control have been directed along the lines hereinafter briefly outlined: If an aircraft be designed to have a cruising altitude level of say, 20,000 feet, it is desirable to supercharge the cabin to such a degree that the cabin will be maintained at a pressure equivalent to no more than a 10,000 feet altitude. In ascending, the cabin and atmosphere will be in communication up to 10,000 feet, after which the cabin superchargers maintain cabin pressure at the 10,000 level regardless of the actual altitude of the aircraft thereabove. When a descent is started, it may be made at a high rate limited only by the maximum permissible speed of the airplane and by the nose-down attitude of the craft beyond which passengers may be uncomfortable. Then, having reached the 10,000 feet level the cabin is opened to the atmosphere after which the rate of descent is largely governed by the rate of pressure increase which the passengers can conveniently undergo. To maintain passenger comfort, the descent rate is normally prescribed at 300 feet per minute since descent rates above this figure are likely to cause pain to the passengers, particularly upon their ears.

It is now axiomatic that high flight levels permit of high cruising speeds due to the rarefied air at high altitude. In the above outlined conventional mode of descent two stages are necessary, one at a relatively high rate and the other at a relatively low rate. Since the low rate is used at lower altitudes, the actual translational speed of the aircraft with respect to the ground is materially reduced since then it is flying in denser atmosphere so that the total time interval necessary to descend from the high altitude cruising level to a landing point is relatively great. Now, if the descent can be effected at an increased and uniform rate in one descent phase the time interval from cruising altitude to the landing point can be reduced. This invention makes such a rapid descent possible in virtue of the proportional cabin pressure maintained all the way from cruising altitude to the ground. That is, if cabin pressure is maintained at a level of 10,000 feet altitude while the actual altitude is 20,000 feet, the aircraft may descend at a rate of 600 feet per minute all the way from 20,000 feet to the landing point while the increase in pressure in the cabin is at the prescribed rate of 300 feet per minute, due to the proportional cabin supercharging control. This increased actual rate of descent can save as much as ten to fifteen minutes of flight time in the descending stage of aircraft operation. In ascending, the above indicated rates are not so important since the passengers can undergo increased rates of ascent without discomfort, but the proportional control of the invention still permits of a rate of pressure change in the cabin less than that of the atmosphere.

Additional objectives will be appreciated from the above discussion and further thereto, an object of the invention comprises the provision of a supercharged cabin air bleed valve controlled by means responsive both to cabin pressure, to atmospheric pressure, and to a proportioning device. A further object is to provide a power operated cabin bleed valve, control of the power source being afforded by pneumatic means responsive in its operation to cabin and atmospheric air pressure. A further object of the invention is to provide means by which equalization of cabin and atmospheric pressure may be preset to any desired altitude level and a further object in this connection comprises the provision of adjusting means for varying the proportionality of cabin altitude to actual altitude. Other objects of the invention include the provision of entrance and exhaust ducts within the cabin by which effective ventilation is afforded, a further incidental object being to provide manually operable means for overcontrolling the automatic cabin pressure regulating means.

For a better understanding of the specific nature of the cabin pressure control mechanism reference may be made to the subsequent detailed description in connection with the drawings, in which:

Fig. 1 is a diagrammatic plan view of an aircraft provided with a pressure cabin, means to supercharge the cabin, means to ventilate the cabin, and pressure control means;

Fig. 2 is a front elevation of the aircraft comprising in general a section on the line 2—2 of Fig. 1;

Fig. 3 is an enlarged sectional elevation of the pressure control system according to a preferred arrangement;

Fig. 4 is a fragmentary section through a simplified form of pressure control mechanism;

Fig. 5 is a graph showing a typical relationship of cabin pressure to altitude and ambient atmospheric pressure when employing a single rate spring system in the control apparatus, with the apparatus adjusted to equate cabin pressure with the ambient pressure at sea level;

Fig. 6 is a graph of the same apparatus when adjusted to equate cabin pressure with the ambient pressure at an altitude of approximately 2,690 feet above sea level; and Fig. 7 is a graph similar to Figure 5 but showing the result of employing one arrangement of dual rate spring system in the apparatus.

Referring to Figs. 1 and 2, 10 represents an aircraft fuselage arranged according to well-known practice to sustain a pressure therein greater than that of the ambient air; wings 11 of the aircraft carry nacelles 12 within which power plants are contained, these power plants driving cabin superchargers 13 to which air is delivered through intake pipes 14. Each of the superchargers may be provided with a throttle 15 manually or automatically controllable to regulate supercharger air delivery and supercharger power. The superchargers deliver air through pipes 16 to a single pipe 17 within the cabin, terminating in an air heater 18 of any suitable type. From the heater, air delivery manifolds 19 extend along the inside of the cabin, these manifolds having spaced air outlets 20 close to the cabin floor 21 as shown in Fig. 2. From the floor 21 ducts 22 rise at spaced intervals along the sides of the fuselage, being open at their upper ends so that air passes into the ducts 22 and is discharged into the space below the floor 21. In general, the entire fuselage interior both above and below the floor 21 will be subject to supercharging pressure, and a unitary automatic valve 23 is provided in the fuselage skin to bleed air from the cabin, this valve being controllable in a manner to be described so as to maintain the desired pressure within the cabin. It is to be understood that the superchargers 13 are capable of supplying air at sufficient pressure and in sufficient volume to maintain both sufficient pressure and adequate ventilation in the cabin under conditions of maximum flight altitude. A check valve 24 is also provided in the cabin wall, the valve being arranged to close to prevent escape of cabin air when the pressure thereof is above atmospheric, but to open to permit entrance of atmospheric air in case the cabin pressure is less than atmospheric.

References may now be made to Fig. 3 which shows the specific details of the control valve structure 23. A valve housing 30 is provided with an open flanged end 31 adapted to be secured to the cabin wall so that the interior of the housing 30 is in free communication with the outside atmosphere. The valve seats 32 and 33 are formed in the housing in coaxial relation and facing in the same direction. Upon these seats, valves 34 and 35 are adapted to seat, said valves being connected by a stem 36 entering a housing 37, the latter being formed with a cylinder 38 through which the stem 36 passes, a piston 39 being secured to the stem 36 for fitting engagement with the cylinder. Movement of the stem 36 jointly opens and closes the valves 34 and 35 and the arrangement of the valves provides an automatic balance therefor regardless of pressure difference between the inside and outside of the cabin. This is due to the fact that atmospheric pressure acts upon the inside of one valve and the outside of another, while cabin pressure acts upon the outside of the one valve and the inside of the other.

Opposite ends of the cylinder 38 are connected through drillings 41 and 42 to a servo valve bore 43 within which a servo valve 44 is slidable. Hydraulic pressure from any suitable pump is directed to the bore 43 through a conduit 46, between the piston elements 47 on element 44. Fluid exit conduits 48 connect with the bore 43 at the ends thereof. It will be seen that when the piston elements 47 cover the drillings 41 and 42, no hydraulic fluid may flow to the cylinder 38. If the valve stem 44 be moved to the right, pressure fluid will pass through the drilling 42 to act upon the righthand side of the piston 39 while fluid on the lefthand side of said piston may pass through the drilling 41 to one of the exhaust conduits 48. If the valve stem 44 is moved to the left, pressure fluid will pass through the drilling 41 from the conduit 46 and will act upon the lefthand face of the piston 39 to move the air valves 34 and 35 to the closing position, and hydraulic fluid on the right side of the piston 39 will exhaust through the drilling 42 and the other exhaust conduit. Accordingly, when the valve stem 44 is moved to the left, the air valves 34 and 35 are closed while if the valve stem 44 is moved to the right, the air valves 34 and 35 are opened. Neutralization of the valve stem 44 will hold the air valves 34 and 35 closed, or at any degree of opening.

The stem 44 is connected through a link 50 to the valve stem 36 and to the end of a bellows 51, the other end of the bellows being secured to an airtight cover 52. The exterior of the bellows 51 is subject to pressure existing within the aircraft cabin, while the interior thereof communicates through a tube 53 with the interior of a second bellows 55 secured at its righthand end to an air tight cover 56 and embraced by an air tight housing 57 which latter communicates with the outside atmosphere through a tube 58. A spring system 60 is contained within the housing 57 and acts between the housing and the bellows 55 in such a manner as to assist atmospheric pressure acting on the outside of the bellows.

Now, before reciting the detailed adjustments of the springs and the bellows of Fig. 3, reference may be made to the simplified arrangement in Fig. 4 in which equivalent parts bear the same numbers as above described, the numbers being primed. It will be seen that the bellows 51' and 55' together contain a fixed amount of elastic fluid, such as air, the partition 52', 56', providing an anchorage therefor. Under sea level conditions, the absolute pressures of the atmosphere, in the cabin, and in the bellows 51', 55' will be equal and the spring 60' will be unstressed except to balance the spring effect of the initially compressed bellows. As the aircraft ascends, the absolute atmospheric pressure becomes lower, and the bellows 55' will tend to extend to balance the absolute pressure therein against the reduced atmospheric pressure, but the spring 60' acts upon the bellows to maintain a pressure therein greater than atmospheric. Now, any difference between the absolute pressure in the cabin interior and the absolute pressure within the bellows 51', 55' will find response in movement of the bellows 51', thus causing actuation of the servo valve 44' to the end that the air valves 34 and 35 are opened or closed until balance obtains between cabin pressure and the absolute pressure in the bellows. The link 50', connected to the air valve stem 36', provides a follow-up mechanism by which pressure balance may obtain over a wide range of altitude.

Since the spring will contract in proportion to the pressure exerted upon it by the bellows, it will be seen that the difference between the bellows internal pressure (which is substantially cabin pressure) and the datum or sea level pressure will bear an approximately constant ratio at all altitudes to the difference between the ambient pressure and the datum pressure. In other words, considering the datum or sea level pressure as the base or "zero" pressure then the bellows internal pressure (cabin pressure) varies with altitude substantially in direct proportion to the ambient pressure. By suitable choice of spring rate, or spring rates, this approximately constant ratio may be any desired value less than unity. The relationship existing between altitude, cabin pressure and the ambient pressure in the standard atmosphere is shown in Figure 5, in which the datum altitude (at which the proportionality begins) is sea level and the rate of the single spring is selected to provide a cabin pressure at 20,000 feet altitude equal to the ambient pressure at 10,000 feet altitude.

The system of Fig. 3 is identical in function to that of Fig. 4, the former however including a dual rate spring system and adjustment provisions which will be described shortly.

The bellows 51, cover 52, tube 53, cover 56, and bellows 55 may be considered as together constituting a single gas container having a pair of wall portions each of which is movable to expand or contract the container. One of these movable wall portions is the tube 76 with flange 77 which seals the left end of bellows 55 and which is rendered movable by the flexibility of the bellows. The exterior surface of this wall portion of the gas container is exposed to the ambient atmospheric pressure which, because of tube 58, exists in the interior of container 57; and this wall portion therefore moves, in response to changes in altitude resulting in changes of ambient atmospheric pressure, to vary the volume of the container and hence the gas pressure therein.

The other movable wall portion of the gas container, rendered movable by the flexibility of bellows 51, may be considered to be the left end wall of this bellows 51. This movable wall portion is exposed to cabin pressure and hence operates the valve 47 in response to variations of the differential between container pressure and cabin pressure; and, if the spring action of bellows 51 is negligible, will operate the valve means in a manner to maintain susbtantial equality between cabin pressure and the container pressure. As the valve system includes check valve 24 which prevents atmospheric pressure from exceeding cabin pressure, it will be seen that this movable wall of bellows 51 constitutes a wall portion of the gas container connected to cabin pressure varying means (the valve means) for operating the latter to regulate cabin in accordance with changes in container pressure when the cabin pressure is greater than the ambient atmospheric pressure.

The pivot between the link 50 and the valve stem 36 is indicated at 62 and on this pivot is also supported a quadrant 63 having spaced stops 64 and 65 engageable, upon the quadrant swinging about the pivot, with the extended end of the link 50. Movement of the quadrant is effected by a manual control 66. The control 66 accordingly provides an overcontrol which if moved to the right closes the air valves 34 and 35 and which if moved to the left opens said air valves.

In the upper part of Fig. 3 it will be seen that the bellows 51 contains a small bellows 68 secured at one end to the cover 52 and sealed at its other end to a cap 69. The small bellows 68 may be extended or compressed through a screw connection 70 between the cap 69 and a rotatable control wire 71. Any change in the state of extension of the small bellows 68 causes a change in the absolute pressure of the elastic fluid within the bellows 51, 55 and this adjustment affords a means by which compensations for temperature, barometric pressure, and mechanical errors may be made. The effect of the adjustment by control wire 71 is to change the effective volume of bellows 51 without changing the amount of fluid therein. This means that the spring system, which will have the same spring rate or rates irrespective of the adjustment, will be neutral at a higher or lower altitude depending upon whether the effective volume of bellows 51 decreased or increased by the adjustment. The effect is shown in Figure 6, where, for the same system and spring rate employed in Figure 5, the effective bellows volume is decreased to such an extent that the spring is neutral at an altitude of about 2,690 feet as the datum pressure. By this adjustment, by rotating wire 71, it will be seen that while in flight the datum pressure may be so adjusted as to equal the barometric pressure at the field where the next landing is to be made, so that cabin pressure will decrease substantially proportionately to altitude until the field level is reached.

In the lower part of Fig. 3 the spring system 60 is disposed between a cap 74 and an adjustable spring abutment 75 bearing on the left end of the housing 57. The cap 74 is secured to the tube 76 having the flange 77 to which the left end of the bellows 55 is sealed. The spring system includes a first spring 78 resting at its right end on the cap 74 and at its left end upon a sleeve 79, the latter also being provided with a flange 80 forming the right abutment for second spring 81 which bears at its left end on the abutment 75. The sleeve 79 is freely slidable upon a guide element 82 which is axially adjustable through screw threads upon a tube 83, said tube also carrying screw threads at its leftward end upon which the abutment 75 is axially adjustable.

The indicated axial adjustments provide for setting the springs at their correct lengths under normal sea level pressure conditions; and the two springs together by virtue of their mechanical arrangement, provide a dual spring rate which satisfies the calibration requirements. Spring 78 is pre-compressed to balance the spring effect of bellows 55 which is also in a compressed state at sea level conditions. Spring 78 is free to compress only until such time as cap 74 strikes flange 80. At this point spring 78 is completely confined and therefore restrained from further deflection, and merely floats with sleeve 79. Spring 81 is pre-compressed to the value which obtains in spring 78 at the instant it (spring 78) reaches its confined length, and therefore spring 81 does not begin to deflect until spring 78 goes out of action. It is therefore evident that the separate stiffnesses of the two springs are effective individually so as to provide two ranges of spring rate which closely approximate the calibration curve of the device, said calibration requiring a decreasing spring rate with deflection, a feat not otherwise possible with helical springs in direct compression.

From the cap 74 a threaded rod 85 extends leftwardly through the element 83 and on the left end is threaded a nut 86 freely slidable to the left from the shoulder shown, within a rotatable bushing 87 to which the nut is keyed as indicated by the dotted line 88. The bushing may be rotated through means of a shaft 89, a coupling 90 and a flexible adjusting shaft 91.

When shaft 91 is turned so that the spring system 60 is in its correct initial position, the control system will effect cabin pressure control in proportion all the way from altitude to sea level. If the shaft 91 be turned so as to draw the threaded shaft 85 to the left, the system 60 will be compressed and the bellows 55 will be expanded so that the pressure therein will be equivalent to some elevated altitude.

The effective altitude within the bellows 55 may be calibrated against the position of the control shaft 91 or may be controlled by the use of a suitable barometer. The utility of this control may be appreciated from the following: If a flight is started at sea level the spring system 60 will be adjusted to initial conditions and as the plane ascends to high altitude the normal functioning previously described will obtain, wherein the bellows 55 expands to carry therein an absolute pressure equivalent to the proportional altitude desired in the cabin. Now, if a landing is to be effected at an elevated point, the control shaft 91 may be rotated and the nut 86 drawn up upon the shaft 85 to that position appropriate to the altitude of the landing field. Then, as the plane descends to the elevated landing field, the bellows 55 will collapse until it is stopped from further collapse by engagement of the nut 86 with the shoulder formed within the element 83, this occurring when the cabin pressure equals that at the level of the elevated field, and serving to maintain such equality as the plane descends to the level of field. The control shaft 91 also allows of operation of the cabin supercharging system in the manner first described wherein pressure balance is effected between the atmosphere and the cabin at some elevated altitude, and upon further descent, the cabin and atmosphere are in communication, without further proportional control and the cabin is naturally ventilated without the benefit of supercharging.

In Figure 7 there is shown an example or typical relationship between cabin pressure, altitude and ambient atmospheric pressure, with the dual rate spring system 78, 81 shown in Figure 3. The spring rates chosen in this instance are such that when flying in a standard atmosphere at 20,000 feet the cabin pressure will be equal to that of a standard atmosphere at 10,000 feet, and that when flying at 10,000 feet the cabin pressure will be mid-way between the pressure at sea level and that at 10,000 feet altitude. In this example the spring 78 was arranged to act between sea level and 10,000 feet, and the spring 81 to act between 10,000 feet and 20,000 feet. As shown this results in the cabin pressure-altitude curve approaching much more closely to a straight line than would be possible with a single rate spring system. Compare Figures 5 and 7 in this respect.

An example of the result obtained by adjustment 91 is shown on Figure 7. If with the airplane in flight at cruising altitude, with adjustment 71 such that the datum pressure is standard sea level pressure and control 91 adjusted so that contraction of the bellows 55 is not limited, during descent the cabin pressure would follow the "Cabin pressure" curve. However if control 91 is now adjusted so that the bellows 55 cannot contract beyond its condition at, for example, a pressure of 27.31 in. Hg (corresponding to an altitude of 2500 feet above sea level in a standard atmosphere) then as the airplane descends the cabin pressure will follow along the "Cabin pressure" curve only to the point designated X, where the cabin pressure is also 27.31 in. Hg and this pressure will be maintained during continued descent of the airplane until the ambient pressure also becomes 27.31. Should the airplane then descend to a still lower altitude, the check valve 24 will open to maintain pressure equality inside and outside of the cabin, the cabin pressure following the curve "Atmospheric pressure."

In case any part of the apparatus should fail in service the manual control 66 may be actuated to overcontrol the automatic bellows mechanism so that cabin supercharge may be governed at the pilot's discretion.

In a large size transport ship it is contemplated that the automatic supercharger throttles 15 will be set to deliver approximately 500 cubic feet per minute of air under the then existent pressure conditions, this amount of air providing adequate cabin ventilation and then passing out through the air valves 34 and 35. It may also be noted that check valves 94 are placed in the supercharger delivery lines 16 so that should engine or supercharger failure occur at high altitude while the cabin is at a pressure higher than the surrounding atmosphere, the pressure air will not bleed back through the superchargers but will be held in the cabin until relieved by the valve system 23.

It is contemplated that the calibrating bellows 68, adjustable through the shaft 71 for temperature and barometric calibration may be automatically controlled by suitable thermostatic and barometric devices for automatic setting of the apparatus without pilot attention.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In aircraft comprising a pressure cabin and a means delivering air thereto at greater than atmospheric pressure, a cabin pressure control system comprising a valve in the cabin wall for bleeding air therefrom, means for operating said air valve including a piston-cylinder unit, means to feed pressure fluid thereto, a fluid valve for controlling fluid admission and egress to and from the unit, and a control for the fluid valve including a pair of pneumatic bellows each fixed at one end and connected to one-another to jointly contain a fixed weight of elastic fluid, one said bellows being subject externally to cabin pressure and the other to ambient air pressure, said fluid valve being connected to the non-fixed end of the first bellows.

2. In aircraft comprising a pressure cabin and a means delivering air thereto at greater than atmospheric pressure, a cabin pressure control system comprising a valve in the cabin wall for bleeding air therefrom, means for operating said air valve including a piston-cylinder unit, means to feed pressure fluid thereto, a fluid valve for controlling fluid admission and egress to and from the unit, and a control for the fluid valve including a pair of pneumatic bellows each fixed at one end and connected to one-another to jointly contain a fixed weight of elastic fluid, one said bellows being subject externally to cabin pressure and the other to ambient air pressure, said fluid valve being connected to the non-fixed end of the first bellows, said connection including a link movable with said air valve to provide a follow-up mechanism for the fluid system.

3. An aircraft cabin pressure control unit comprising a balanced air valve communicating at its opposite sides with the ambient air and the cabin interior, a fluid motor to open and close said air valve, and a fluid valve to control said fluid motor including a link connection to the air valve and means responsive to the difference between ambient pressure and cabin pressure for moving the fluid valve.

4. An aircraft cabin pressure control unit comprising a balanced air valve communicating at its opposite sides with the ambient air and the cabin interior, a fluid motor to open and close said air valve, and a fluid motor control valve comprising a bellows system including a fixed quantity of elastic fluid and subject at one zone to ambient pressure augmented by resilient means and at another zone to cabin pressure, the valve being movable in response to movements of the bellows portion in the cabin pressure zone.

5. In aircraft cabin pressure control unit comprising a balanced air valve communicating at its opposite sides with the ambient air and the cabin interior, a fluid motor to open and close said air valve, and a fluid motor control valve comprising a bellows system including a fixed quantity of elastic fluid and subject at one zone to ambient pressure and at another zone to cabin pressure, the valve being movable in response to movements of the bellows portion in the cabin pressure zone, and a follow-up linkage connecting the air-valve, the fluid valve and the latter named bellows portion.

6. An aircraft cabin pressure control unit comprising a balanced air valve communicating at its opposite sides with the ambient air and the cabin interior, a fluid motor to open and close said air valve, and a fluid motor control valve comprising a bellows system including a fixed quantity of elastic fluid and subject at one zone to ambient pressure and at another zone to cabin pressure, the valve being movable in response to movements of the bellows portion in the cabin pressure zone, and manual means to overcontrol said fluid motor to selectively open or close said air valve.

7. An aircraft cabin pressure control system including an air valve between the cabin and ambient air, comprising a first bellows exposed on one side to the ambient air and on its other side to a fixed quantity of elastic fluid, adjustable resilient means acting on said bellows, a second bellows exposed on one side to said fixed quantity of elastic fluid and on its other side to the cabin air, said latter bellows being movable in response to ambient and cabin air pressure changes, and an operating connection for said air valve actuated by the indicated bellows movement.

8. An aircraft cabin pressure control system including an air valve between the cabin and ambient air, comprising a first bellows exposed on one side to the ambient air and on its other side to a fixed quantity of elastic fluid, adjustable resilient means acting on said bellows, a second bellows exposed on one side to said fixed quantity of elastic fluid and on its other side to the cabin air, said latter bellows being movable in response to ambient and cabin air pressure changes, and an operating connection for said air valve actuated by the indicated bellows movement, and means for adjusting the amount of said fixed quantity of fluid.

9. An aircraft cabin pressure control system including an air valve between the cabin and ambient air, comprising a first bellows exposed on one side to ambient air and on its other side to a fixed quantity of elastic fluid, a second bellows exposed on one side to said fixed quantity of elastic fluid and on its other side to the cabin air pressure, and means to adjust said air valve in response to movements of said second bellows.

10. An aircraft cabin pressure control system including an air valve between the cabin and ambient air, comprising a first bellows exposed on one side to the ambient air and on its other side to a fixed quantity of elastic fluid, a second bellows exposed on one side to said fixed quantity of elastic fluid and on its other side to the cabin air pressure, means to adjust said air valve in response to movements of said second bellows, and a spring acting against said first bellows to govern the movement thereof to maintain a certain proportionality in bellows movements to the ambient air pressure.

11. An aircraft cabin pressure control system including an air valve between the cabin and ambient air, comprising a first bellows exposed on one side to ambient air and on its other side to a fixed quantity of elastic fluid, a second bellows exposed on one side to said fixed quantity of elastic fluid and on its other side to the cabin air pressure, means to adjust said air valve in response to movements of said second bellows, a spring acting against said first bellows to govern the movement thereof to maintain a certain proportionality in bellows movements to the ambient air pressure for one range, and a second spring acting serially with the first for the same purpose in another range, said springs having an adjustment settable to balance the cabin pressure against ambient pressure at any selected value or altitude.

12. An aircraft cabin pressure control system including an air valve between the cabin and ambient air, comprising a first bellows exposed on one side to the ambient air and on its other side to a fixed quantity of elastic fluid, adjustable resilient means acting on said bellows, a second bellows exposed on one side to said fixed quantity of elastic fluid and on its other side to the cabin air, said latter bellows being movable in response to ambient and cabin air pressure changes, and an operating connection for said air valve actuated by the said bellows movement, and means for adjusting the density of said fixed quantity of fluid.

13. In an aircraft cabin pressure control system, means for varying the cabin pressure, a gas container having a pair of wall portions movable to expand or contract the container, one of said wall portions having its exterior exposed to cabin pressure and being connected to said cabin pressure varying means for operating the latter to regulate cabin pressure in accordance with changes in container pressure when the cabin pressure is greater than ambient atmospheric pressure, the exterior of the other movable wall portion being exposed to the ambient atmospheric pressure, and means for resiliently opposing movement of said wall portion in a direction to expand the container, said last mentioned means comprising a plurality of springs having different spring rates, and said springs being arranged to act in sequence in resisting expansion of the container.

14. In an aircraft cabin pressure control system, means for varying the cabin pressure, a gas container having a pair of wall portions movable to expand or contract the container, one of said wall portions having its exterior exposed to cabin pressure and being connected to said cabin pressure varying means for operating the latter to regulate cabin pressure in accordance with changes in container pressure when the cabin pressure is greater than ambient atmospheric pressure, the exterior of the other movable wall portion being exposed to the ambient atmospheric pressure, means for resiliently opposing movement of said other movable wall portion in a direction to expand the container, whereby pressure within the container will decrease from a selected datum pressure substantially in proportion to decrease of the ambient pressure from such datum pressure, means to adjust the volume of the container to vary the pressure therein and thereby to vary the datum pressure, and adjustable stop means for limiting the movement of said other movable wall portion in a direction to contract the container, to thereby limit the maximum cabin pressure when the latter exceeds the ambient atmospheric pressure.

15. In an aircraft cabin pressure control system, means for varying the cabin pressure, a gas container having a pair of wall portions movable to expand or contract the container, one of said wall portions having its exterior exposed to cabin pressure and being connected to said cabin pressure varying means for operating the latter to regulate cabin pressure in accordance with changes in container pressure when the cabin pressure is greater than ambient atmospheric pressure, the exterior of the other movable wall portion being exposed to the ambient atmospheric pressure, means for resiliently opposing movement of said other movable wall portion in a direction to expand the container, whereby pressure within the container will decrease from a selected datum pressure substantially in proportion to decrease of the ambient pressure from such datum pressure, and means to adjust the volume of the container to vary the pressure therein and thereby to vary the datum pressure.

16. In an aircraft cabin pressure control system, means for varying the cabin pressure, a gas container having a pair of wall portions movable to expand or contract the container, one of said wall portions having its exterior exposed to cabin pressure and being connected to said cabin pressure varying means for operating the latter to regulate cabin pressure in accordance with changes in container pressure when the cabin pressure is greater than ambient atmospheric pressure, the exterior of the other movable wall portion being exposed to the ambient atmospheric pressure, means for resiliently opposing movement of said other movable wall portion in a direction to expand the container, whereby pressure within the container will decrease from a selected datum pressure substantially in proportion to decrease of the ambient pressure from such datum pressure, and adjustable stop means for limiting the movement of said other movable wall portion in a direction to contract the container, to thereby limit the maximum cabin pressure when the latter exceeds the ambient atmospheric pressure.

17. In an aircraft cabin pressure control system, means for varying the cabin pressure, a gas container having a pair of wall portions movable to expand or contract the container, one of said wall portions having its exterior exposed to cabin pressure and being connected to said cabin pressure varying means for operating the latter to regulate cabin pressure in accordance with changes in container pressure when the cabin pressure is greater than ambient atmospheric pressure, the exterior of the other movable wall portion being exposed to the ambient atmospheric pressure, and means for resiliently opposing movement of said other movable wall portion in a direction to expand the container, container expansion being substantially in proportion to the difference between container pressure and the ambient pressure, whereby pressure within the cabin will decrease from a selected datum pressure substantially in proportion to decrease of the ambient pressure from such datum pressure.

JOSEPH JERGER.

REFERENCES CITED

The following references are of record in the file of this patent:

UNITED STATES PATENTS

| Number | Name | Date |
|---|---|---|
| 1,511,489 | Armstrong | Oct. 14, 1924 |
| 1,562,663 | Strong | Nov. 24, 1925 |
| 2,002,057 | Gregg | May 21, 1935 |

FOREIGN PATENTS

| Number | Country | Date |
|---|---|---|
| 679,386 | France | Jan. 9, 1930 |